Sept. 20, 1971 W. P. ROGERS 3,605,316
COTTONSEED FISH BAIT TABLETS
Filed Feb. 28, 1969

INVENTOR.
William P. Rogers 3,605,316
COTTONSEED FISH BAIT TABLETS
William P. Rogers, Box 1297, Little Rock, Ark. 72203
Filed Feb. 28, 1969, Ser. No. 803,486
Int. Cl. A01k *85/00*
U.S. Cl. 43—42.06     2 Claims

ABSTRACT OF THE DISCLOSURE

This invention relates to the configuration and method of production of a fish bait material in tablet form.

---

Figure 1:
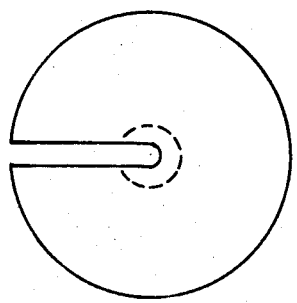
Figure 2:
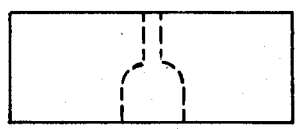
Figure 3:
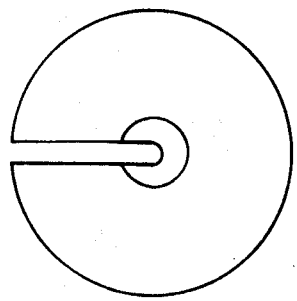
Figure 4:
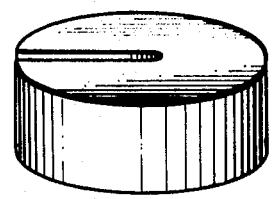
Figure 5:
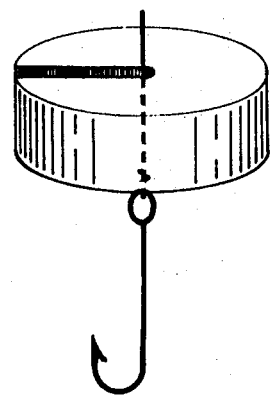
Figure 6:
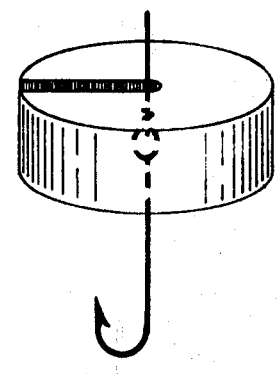

The object of this invention is to provide a means of combining oilseed meals with other known natural fish attracting ingredients in a homogeneous blend with a binder and pressing this mixture into a specified shape that will permit convenient attachment to fishing lines.

Another object is to provide a clean, convenient bait form that has indefinite dry storage life and little objectionable odor when in the dry tablet form and in which the binding agent imparts no taste or odor which would interfere with the fish attracting properties of the fish bait material.

This disclosure covers the design, formulation, and production of a fish bait material which is shaped to permit rapid baiting of hooks and secure attachment of the bait to the line and hook in such a way as to permit the use of said bait in flowing or still water.

The material is composed of a mixture of a vegetable seedmeal and oil, normally cottonseed meal and cottonseed oil, wax, a parachlorometaxylenol preservative equal to Ottasept Tech, Ottawa Chemical Company, a flavoring agent or oil including but not limited to one of the following; oil of anise seed, dried blood, fish oil, and cheese essence. This mixture being mixed with a liquid urea-formaldehyde water-soluble resin of a type equal to Reichhold 21-020 Plyamine Resin, Reichhold Chemicals, Inc., which is activated with a catalyst equal to Reichhold 46-100 Plyamine Catalyst, Reichhold Chemicals, Inc., to produce an insoluble binder which has no noticeable taste or odor. The purpose of said binder is to hold the fish attractive materials together in functional form while affixed to the hook and submerged in water for a suitable period of time, normally four to twelve hours. This functional material is combined with a proper tablet design and configuration to comprise a system whereby the fish bait material in a special tablet form is compatable with normal fishing equipment and techniques for scent feeding fish.

The production procedure for said material involves combining in a preliminary mixture the oilseed meal and oilseed oil with hot paraffin wax. The preservative may also be added at this stage in the preliminary mix. A practical procedure has been established wherein the oilseed oil and the parachlorometaxylenol preservative are mixed into the molten wax at a temperature of 170 degrees F., this solution then being blended into the oilseed meal and cooled to a temperature of 80 degrees F. or less. This preliminary mixture is then mixed in an intensive mixer with the liquid resin binder to which the catalyst has been added. The mixture will change from a dough-like consistency in the mixer to a granular free-flowing consistency in approximately thirty minutes at 70 degrees F. while being mixed. A flavoring agent such as previously mentioned may be added just prior to adding the catalyzed resin if added flavoring is desired. [1]

The granular material from the intensive mixer is then fed through a hopper into a pharmaceutical type mechanical tablet press, of a style commonly known as a single punch tablet press, with a pressing capacity of not less than twelve tons per square inch. Operating pressure should be maintained at approximately ten tons per square inch during the compaction cycle of the press in a die designed to produce the illustrated tablet configuration. The granular mix should be processed into tablets within four hours after the intensive mix operation.

The design of this final configuration involves forming the material into a tablet shape, said shape having a slit or channel of approximately the width of the diameter of the intended fishing line extending from the outer edge to the center of the tablet.

In addition, the design of the tablet shall include a hole or indention formed in the base of the tablet which is slightly larger than the diameter of the eye of the intended size hook. Said hole to extend approximately one-half the depth of the tablet.

Intersecting this hole shall be a smaller diameter hole extending from the said intersection through the top of the tablet. The diameter of this hole being slightly larger than the diameter of the intended fishing line to be used with this system.

Thus the design involves a tablet shape having a slit to the center and a two-diameter hole extending through it, the larger diameter being on the bottom. The purpose of said design being to permit the fish bait material to be affixed to the hook and line by pressing the line attached to the hook through the slit from the outer edge to the center of the tablet and then sliding the tablet down the line in such a manner that the eye of the hook is seated inside the larger diameter hole in the base of the tablet. The smaller diameter hole permitting free passage of the line through it but not the hook eye, being smaller than the diameter of the hook eye, and thus locking the bait material to the top of the hook from any movement except upward.

This design will cause the weight of the tablet and/or the pressure of moving water against the top of the tablet to keep the tablet maintained affixed to the top of the hook and in position to hook fish that are attracted to the bait material.

---

[1] The normal proportions of the material is as follows: Using the oilseed meal as the base ingredient by weight, the oilseed oil shall be approximately 1% of the weight of meal, the preservative 1%, the wax being 25% and the following agent from 1% to 10% depending upon the agent used. The reactive resin shall be 20% of the total weight of meal used and the catalyst shall be 10% by weight of the amount of resin used. This basic formulation may be adjusted to permit variation in the length of time of disintegration in water as desired.

I claim:

1. A fish bait comprising a fish-attracting composition in the form of a tablet to provide for controlled disintegration and release of the fish-attracting composition, the tablet being composed of cottonseed meal, cottonseed oil, paraffin wax and urea-formaldehyde resin binder, and as flavoring agents minor amounts of dried blood, fish oil, seed oils and cheese, the proportion of cottonseed oil approximating 1% by weight of the meal, paraffin wax about 25% by weight, and the resin binder approximately 20% by weight of the meal, the tablet having a slit or cut-a-way channel portion extending from the outer edge to the center of the tablet for receiving a fishing line, the slit communicating with an enlarged diameter hole in the base of the tablet for receiving the eye of a fish hook attached to the fishing line.

2. A fish bait tablet as in claim 1 whereby the tablet is affixed to the fishing line and locked over the hook so that the force of moving water over the tablet will keep the bait firmly in position over the hook.

References Cited

UNITED STATES PATENTS

| | | | |
|---|---|---|---|
| 2,555,088 | 5/1951 | Irwin | 43—41 |
| 2,780,021 | 2/1957 | Fagg | 43—44.99 |
| 2,979,778 | 4/1961 | Fitzsimons | 43—42.06X |
| 3,047,975 | 8/1962 | Pretorius | 43—42.06 |
| 3,163,958 | 1/1965 | Quinn | 43—42.06 |

OTHER REFERENCES

U.S. Dept. of Interior "Fishery Leaflet" 28 (1950), pp. 16–21 incl.

NORMAN YUDKOFF, Primary Examiner

F. E. DRUMMOND, Assistant Examiner

U.S. Cl. X.R.

43—44.90, 44.99; 99—3